United States Patent Office.

RENÉ BOHN, OF LUDWIGSHAFEN, GERMANY, ASSIGNOR TO THE BADISCHE ANILIN AND SODA FABRIK, OF SAME PLACE.

BLUE DYE.

SPECIFICATION forming part of Letters Patent No. 440,536, dated November 11, 1890.

Application filed September 24, 1890. Serial No. 366,010. (Specimens.)

*To all whom it may concern:*

Be it known that I, RENÉ BOHN, doctor of philosophy, a citizen of Switzerland, residing at Ludwigshafen-on-the-Rhine, in the Kingdom of Bavaria and Empire of Germany, have invented new and useful Improvements in the Manufacture of a Blue Coloring-Matter, of which the following is a specification.

As is known a symmetrical dihydroxybenzoic acid $C_6H_3COOH.OH.OH(1.3.5.)$ can be obtained by melting metadisulpho-benzoic acid with an an excess of caustic potash, (Barth & Senhofer, Annalen der Chemie, 159, 222;) but no means have hitherto been known of technically applying this compound in the manufacture of coloring-matters.

My invention is based on the discovery that by the action of nitroso derivatives of tertiary aromatic bases on the said dihydroxybenzoic acid new and valuable coloring-matters can be obtained, which can be applied to woolen fabrics, producing blue shades with or without the aid of a mordant, and which also can be used in dyeing and printing suitably-mordanted vegetable fiber.

The condensation of the symmetrical dihydroxybenzoic acid with the above-mentioned nitroso derivatives can be effected in some cases in aqueous or alcoholic solution, or in other cases in acetic-acid solution, and usually takes place at temperatures below 100° centigrade.

To fully illustrate and describe my invention, I give as an example the following directions for preparing from symmetrical dihydroxybenzoic acid and nitroso-dimethylaniline a new blue coloring-matter, which is the body I desire to protect by this application for Letters Patent.

Dissolve about ten (10) parts, by weight, of symmetrical dihydroxybenzoic acid in about one thousand (1,000) parts, by weight, of water. Raise the temperature to about 70° centigrade (70° C.) and gradually add at this temperature, and while continuously stirring, about twelve (12) parts, by weight, of the hydrochloric acid salt of nitroso-dimethylaniline. Allow the mixture to stand for, say, about five hours. The new coloring-matter separates out during this interval as a crystaline precipitate showing a metallic luster. Filter and wash with cold water. The paste or pulp so obtained can be applied at once to dyeing and printing, or the coloring-matter can first be further purified. For this purpose, dissolve it in dilute soda solution, filter, and precipitate the filtrate with an acid.

The nitroso-dimethylaniline can, if desired, be used in forms other than hydrochlorate—viz., as free base or in the form of salts with other acids without altering the nature of the product obtained.

The coloring-matters which can be obtained by suitable treatment of dihydroxybenzoic acid with the nitroso derivatives of other tertiary amines are not claimed in this application for Letters Patent.

My new dye-stuff is characterized by the following properties: In the dry state it is a crystalline powder of dark color possessing usually a strong metallic luster which may vary in shade from violet to green. On rubbing it always gives a blue streak. It comes into commerce as a rule in the form of paste or pulp which has a dirty-greenish color. It is but slightly soluble or practically insoluble in cold water; but it is readily soluble in dilute alkalies, giving beautiful blue solutions. It is both acid and basic in its properties and yields salts with both acids and alkalies. It is practically insoluble in benzine and ether, but soluble in alcohol, and this solution is most characteristic, being reddish-violet in color and marked by a striking reddish fluorescence. The color and fluorescence of this solution serve to distinguish the new coloring-matter from all which resemble it in its other properties. It dyes wool directly or with the aid of a mordant yielding, for instance, with a chrome mordant, blue shades of surpassing brilliancy and beauty. It possesses, moreover, the valuable property of dyeing well in mixture with other dye-stuffs which fix themselves on chrome mordants. Thus the colors obtained with alizarine-blue can be considerably brightened and beautified by the admixture of my new dye-stuff.

What I claim as new, and desire to secure by Letters Patent, is—

As a new product, the blue dye which in the form of paste appears to be of a dirty-greenish color; when dry it can be obtained as a crystalline powder of dark color possessing a metallic luster, the color of which may vary from violet to green; the color of the body as shown by its streak on rubbing is blue; it is but very slightly soluble in cold water, but is readily soluble in dilute alkalies, giving beautiful blue solutions; it is practically insoluble in benzine and ether, but soluble in alcohol, and the alcoholic solution is most characteristic, being reddish-violet in color and marked by a striking reddish fluorescence.

In testimony whereof I have hereunto set my hand in the presence of two subscribing witnesses.

RENÉ BOHN.

Witnesses:
ERNEST F. EHRHARDT,
OSCAR BALLY.